United States Patent
Karras (10) Patent No.: US 7,657,129 B2
(45) Date of Patent: Feb. 2, 2010

(54) OPTICAL FOCAL PLANE DATA COUPLER

(75) Inventor: Thomas W. Karras, Berwyn, PA (US)

(73) Assignee: Lockheed Martin Corporation, Bethesda, MD (US)

(*) Notice: Subject to any disclaimer, the term of this patent is extended or adjusted under 35 U.S.C. 154(b) by 0 days.

(21) Appl. No.: 12/203,888

(22) Filed: Sep. 3, 2008

(65) Prior Publication Data

US 2009/0060409 A1 Mar. 5, 2009

Related U.S. Application Data

(60) Provisional application No. 60/969,922, filed on Sep. 4, 2007.

(51) Int. Cl.
- G02F 1/01 (2006.01)
- G02F 1/035 (2006.01)
- G02F 1/295 (2006.01)
- G02F 1/335 (2006.01)

(52) U.S. Cl. .............. 385/1; 385/2; 385/4; 385/8; 385/9

(58) Field of Classification Search ............. 385/1, 385/2, 4, 8, 9

See application file for complete search history.

(56) References Cited

U.S. PATENT DOCUMENTS

| | | | |
|---|---|---|---|
| 6,195,187 B1 | 2/2001 | Soref et al. |
| 6,202,493 B1 | 3/2001 | Cantrall et al. |
| 6,522,794 B1 | 2/2003 | Bischel et al. |
| 6,790,691 B2 | 9/2004 | Dudoff et al. |
| 7,092,591 B2 | 8/2006 | Savchenkov et al. |

FOREIGN PATENT DOCUMENTS

WO  WO 02/103448 A2  12/2002

*Primary Examiner*—Frank G Font
*Assistant Examiner*—Mary A El Shammaa
(74) *Attorney, Agent, or Firm*—McDermott Will & Emery LLP (57) ABSTRACT

Systems are disclosed that utilize electrical signals from detectors of an imaging focal plane array or antenna elements of an antenna array to modulate optical signals. Antenna or focal plane array elements are coupled to optical waveguides by way of whispering gallery mode resonators made of electro-optic material. The resonators modulate optical signals in the waveguides based on the electrical signals from the detectors/antenna elements. The signals received by the array are converted into the optical domain, allowing subsequent optical processing and/or distribution. Each detector/antenna element involved can be identified by the specific wavelength and waveguide through which its signal is coupled, enabling subsequent optical processing of the signals such as by wavelength division multiplexing systems. Additionally disclosed are imaging sensor photonic systems that include WDM components and other optical components such one or more optical narrow-band amplifiers and/or filters. Related electro-optic modulation and tuning methods are also described.

27 Claims, 6 Drawing Sheets

OPTICAL FOCAL PLANE DATA COUPLER

RELATED APPLICATION

This application claims the benefit of U.S. Provisional Patent Application No. 60/969,922 filed 4 Sep. 2007, the contents of which are incorporated by reference herein in their entirety.

STATEMENT REGARDING FEDERALLY SPONSORED RESEARCH OR DEVELOPMENT

Not Applicable.

FIELD OF THE INVENTION

The present invention generally relates to data coupling and, in particular, relates to methods and systems for electro-optically modulating signals from an antenna array, such as a photodiode focal plane array.

BACKGROUND

Antenna arrays, including focal plane image sensors such as charge coupled device (CCD) diode arrays, are used in a number of signal transmission and receiving applications as well as imaging applications and over a large range of frequencies of the electromagnetic spectrum. Traditionally, signals received at an antenna array were electronically amplified and converted to an intermediate frequency for subsequent electronic signal processing.

More recently, with a growing need for increased bandwidth and speed, optical processing techniques have been implemented for the processing of signals from antenna arrays and imaging systems. For such techniques, electro-optic modulators relying on zero-order interferometry, such as Mach-Zender modulators, or those utilizing polarization rotation as the basis for electro-optic modulation have been used to convert detected electrical signal into the optical domain by using the antenna array signals to modulate optical carrier signals in optical waveguides. For such applications, it has been common to use electronic low noise amplifiers and (tunable) filters to process the signals from the antenna arrays and image sensors prior to electro-optic modulation.

Such prior electro-optic modulation techniques have been useful for some application but have been limited for other applications by exhibiting low bandwidth, low gain, and high noise figures. Additionally, such prior art modulation techniques have required relatively high power levels for sufficient modulation—on the order of 1 Watt of microwave power and have required large size requirements (or form factors) due to the significant optical paths required for sufficient modulation to take place.

What is needed therefore are systems, apparatus, and methods that can provide higher bandwidth, higher gain, and lower noise figures as well as lower form factors.

SUMMARY OF THE INVENTION

The present invention provides systems, apparatus, and methods that address the limitations noted for the prior art by the utilization of optical whispering gallery mode resonators coupled to the outputs of antenna array elements.

Embodiments and aspects of the present invention include systems and methods, including photonic architectures, that utilize whispering gallery mode resonators for modulation (e.g., amplitude modulation) of optical carrier signals based on electrical signals detected from an antenna array electrically coupled to the whispering gallery mode resonators. By utilizing whispering gallery mode resonators made of suitable electro-optic material(s), the electrical signals each antenna array element, e.g., discrete antenna element or photodiode, can be used to modulate optical carrier signals. The electrical signals from the antenna elements can accordingly be converted into the optical domain for subsequent use.

According to one embodiment of the present invention, electrical signals from detectors (pixels) of an imaging focal plane array (or antenna elements of an antenna array) are coupled to optical waveguides by way of micro-resonators in the form of whispering gallery mode resonators. The resonators modulate optical signals in the waveguides based on the electrical signals from the detectors or antenna elements. In such manner, the signals received by the array are converted into the optical domain, allowing subsequent optical processing and/or distribution.

Each detector/antenna element involved (which can correspond to an individual picture element or "pixel") can be identified by the specific wavelength and waveguide through which its signal is coupled, enabling subsequent optical processing of the signals. Electro-optic modulation systems or couplers according to the present invention may consequently be very compact, allowing it to fit within the small form factor of the arrays, and to require very little electrical power.

Further embodiments of the present invention are directed to related methods of electro-optically modulating electrical signals received at antenna arrays and focal plane arrays. For such methods, signals such as those corresponding to an optical field of view, are received by an antenna array, such as focal plane array ("FPA"). The array can be coupled to an array of whispering gallery mode resonators, which can be coupled to one or more optical waveguides. Optical carrier signals in the waveguides are modulated by the resonators based on the signals received from the antenna array. The carrier signals may then be used in wavelength division multiplexing ("WDM") applications.

Additional embodiments of the present invention are directed to imaging sensor photonic architecture or system that, in addition to an antenna array and whispering gallery mode resonator array, include WDM components and other optical components such one or more optical narrow-band amplifiers and/or filters.

In the following description, reference is made to the accompanying figures, illustrating specific embodiments in which the invention may be practiced. It is to be understood that other embodiments may be utilized and changes may be made without departing from the scope of the present invention.

For the description herein, it should be noted that in the description herein, reference to an element in the singular is not intended to mean "one and only one" unless specifically stated, but rather "one or more." The term "some" refers to one or more. Underlined and/or italicized headings and subheadings are used for convenience only, do not limit the invention, and are not referred to in connection with the interpretation of the description of the invention.

BRIEF DESCRIPTION OF THE DRAWINGS

Aspects of the present invention may be more fully understood from the following description when read together with the accompanying drawings, which are to be regarded as illustrative in nature, and not as limiting. The drawings are not necessarily to scale, emphasis instead placed on the principles of the disclosure. In the drawings:

FIG. 3A depicts a side view of an embodiment of a whispering gallery mode resonator according to the present disclosure while

While certain embodiments depicted in the drawings, one skilled in the art will appreciate that the embodiments depicted are illustrative and that variations of those shown, as well as other embodiments described herein, may be envisioned and practiced within the scope of the present disclosure.

DETAILED DESCRIPTION OF THE INVENTION

The present invention is directed to methods and systems, including photonic architectures, that utilize micro-resonators in the form of whispering gallery mode resonators for modulation of optical carrier signals based on signals detected from an antenna array coupled to the whispering gallery mode resonators. When the micro-resonator is made of electro-optic material, the resonant wavelength can be made to be sensitively dependent upon applied voltages, thus modulating any continuous wave (CW) optically coupled signal. Optical whispering mode gallery resonator modes propagate around the equator of the disk or toroid (or sphere) structure with relatively high quality factors (Q) owing to the total internal reflection and possible low absorption losses of the resonator material.

Because of the relatively long interaction lengths between the electrical and optical fields in a whispering gallery mode resonator made of suitable electro-optical material, such resonators can be made relatively small and still be effective as electro-optic modulators. Use of such whispering gallery mode resonators can allow electrical signals from an antenna array to be used to modulate (e.g., by amplitude modulation) optical carrier signals such as those in wavelength division multiplexing (WDM) or other optical systems, e.g., as shown in U.S. Pat. No. 6,473,278, which is incorporated in its entirety herein by reference.

Such configurations of coupled antenna elements and whispering gallery mode resonators can provide several advantages including corresponding bandwidths from DC to many GHz. Applications of use can include modulators, filters, sensors, and the like. The only electrical power required is the few milliwatts required for the optical sources used for the optical carrier signals, such as vertical cavity surface-emitting lasers ("VCSELs"), needed to produce each wavelength; typically each optical source (laser) can be used to drive a number of different waveguides. Often no electrical signal amplification is required prior to the optical modulation, greatly simplifying the construction. Moreover, the array of micro-resonators can be of dimensions comparable to those of the focal plane array, and may therefore be mechanically integrated with it in exemplary embodiments. Rapid tuning of the micro-resonators is also possible to allow agility to the readout process and thereby assist the processing function. Subsequent narrowband optical amplification can be used to compensate for weak signal strength, eliminating the need for an electrical low-noise amplifier ("LNA") between the pixel and the micro-resonator. For some application such LNA may prove useful and can be implemented.

As noted previously, the optical carrier signals can be those of a wavelength division modulation (WDM) system. Because such optical signals can be generated with low-power devices such as suitable laser diodes (e.g., VCSELs), the electrical to optical conversion/modulation afforded by embodiments of the present invention does not require large amounts of power. In addition to or substitution for VCSELS, other suitable lights sources may be used for the WDM carrier signals, e.g., distributed Bragg reflector (DBR) diode lasers and distributed feedback (DFB) diode lasers.

Each whispering gallery mode resonator can be tuned, e.g., by size and material selection or application of a bias voltage, so that the electrical signal modulates (e.g., amplitude modulates) a specific wavelength of light. Accordingly, a row of antenna elements can have its signals coupled to a single optical waveguide, with each antenna element signal (corresponding to a pixel) on a different wavelength. This process can be implemented with wavelength division multiplexing ("WDM") techniques, e.g., systems and components, for which there are a large number of commercial components that can be used to process the signals coming off the multiple waveguides.

Figure 1:
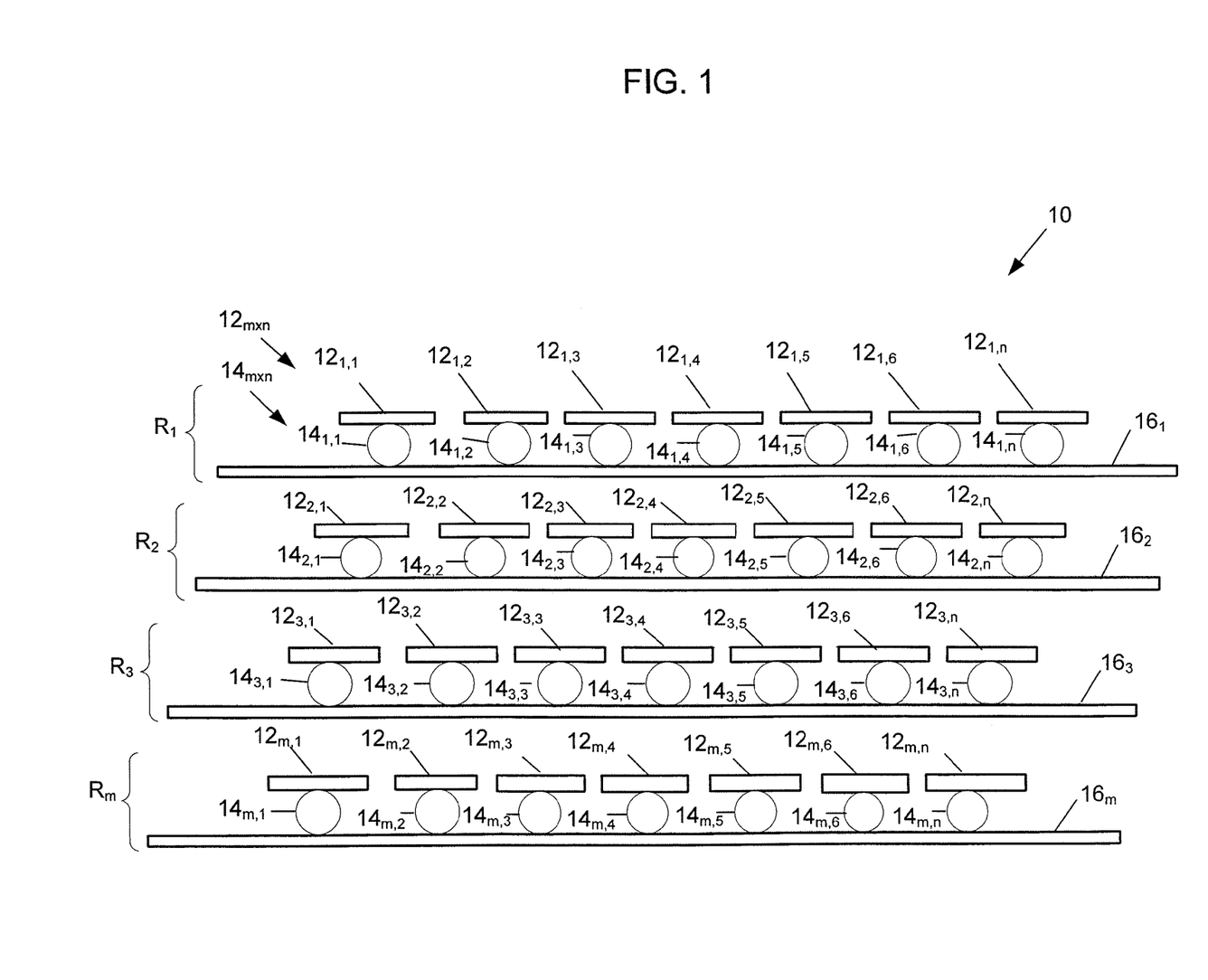
FIG. 1 depicts a diagrammatic view of a system including an antenna array coupled to an array of whispering gallery mode resonators in accordance with an embodiment of the present invention.

FIG. 1 depicts a diagrammatic view of an embodiment of a system 10 according to the present invention. System 10 includes a two-dimensional (m×n) antenna array $12_{m \times n}$ with antenna elements 12 arranged in rows and columns, as denoted by subscript indices $12_{m,n}$. An array of whispering gallery micro-resonators $14_{m \times n}$ is configured in proximity to the antenna array $12_{m \times n}$ such that a whispering gallery mode resonator is coupled to and can receive the output from each antenna element. Each row of antenna elements $12_{m,n}$ is coupled to a row of micro-resonators $14_{m,n}$, which in turn are coupled to an individual waveguide $16_1$-$16_m$ as shown by row architectures $R_1$-$R_m$. The configuration shown allows for coupling (by evanescent coupling) of the electromagnetic fields of the antenna array $12_{m \times n}$ to the optical field of the resonators $14_{m,n}$ and waveguides $16_1$-$16_m$, allowing for modulation of optical carriers in waveguides $16_1$-$16_m$.

As described previously, each whispering gallery mode resonator $14_{m,n}$ can be tuned so that the electrical signal it receives (from the corresponding antenna element) modulates a specific wavelength of light, e.g., as shown in U.S. Pat. No. 6,473,278, which is incorporated in its entirety herein by reference. In this way, a row of detectors/antennas of the antenna array (e.g., corresponding to a row of pixels) can have signals coupled to a single waveguide, with each pixel/antenna signal on a different wavelength. Thus, enabling implementation with wavelength division multiplexing (WDM) techniques, e.g., systems and components, including those conforming to the International Telecommunication Union ("ITU") Grid defining optical wavelength/frequency channel spacing for common WDM applications.

In exemplary embodiments, antenna elements $12_{m,n}$ can be individual photo-detectors of a focal plane array (FPA), such that the output of each detector corresponds to a picture element ("pixel") of an image received at the focal plane array. Such photo-detectors can be designed and implement to receive desired wavelengths of light, e.g., in a desired portion of the infrared spectrum, by selection of suitable semiconductor materials for such devices. In further exemplary embodiments, the antenna elements can include microwave antennas such as those useful for radar systems. Antenna elements designed for other wavelengths/frequencies of EM or light radiation may be utilized.

With continued reference to FIG. 1, electro-optic materials suitable to form whispering gallery mode resonators $12_{m,n}$ may be any suitable crystalline electro-optic material. For example, electro-optic materials that can be can be used for resonators $12_{m,n}$ include those such as lithium niobate ($LiNO_3$), lithium tanatalate ($LiTaO_3$), ammonium dihydrogen phosphate ($NH_4H_2PO_4$) or "ADP," potassium dihydrogen phosphate ($KH_2PO_4$) or "KDP," and/or cadmium telluride (CdTe). Other suitable materials, such as ones useful as Pockels media (producing a linear electro-optic effect), may also be utilized for whispering gallery mode resonators in accordance with the present invention. Such materials may include suitable dopants, including deuterium (the material may be deuterated).

Figure 2:
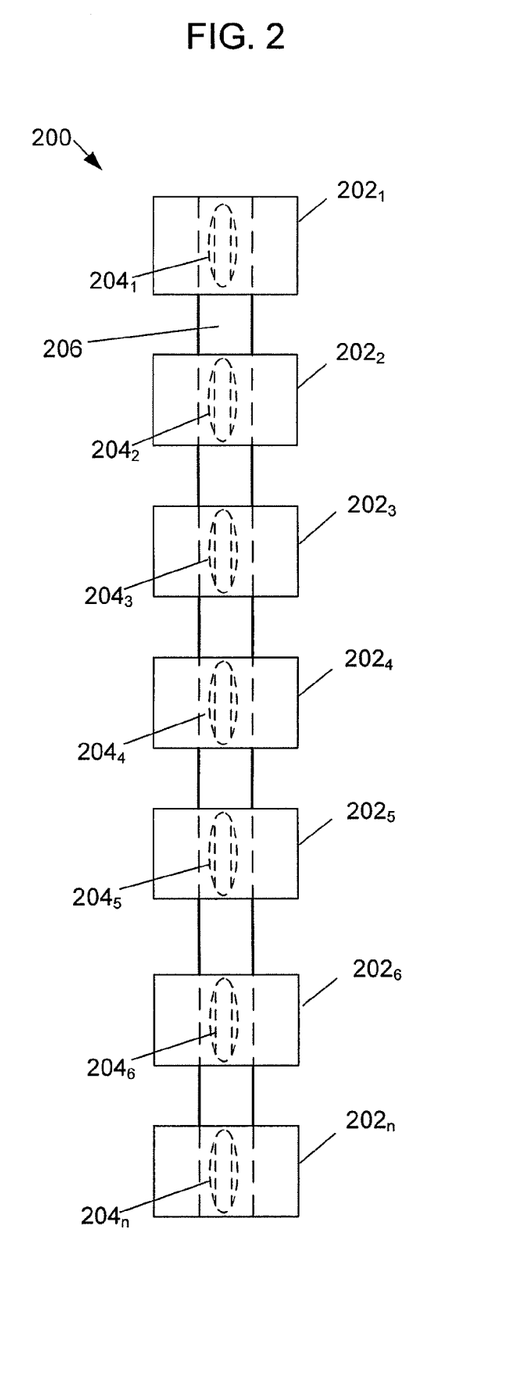
FIG. 2 depicts a top view of a row of antenna array elements of an antenna array coupled to whispering gallery mode resonators and an optical waveguide, in accordance with an embodiment of the present invention.

Referring to FIG. 2, a top view of a row architecture 200 of an electro-optic system in accordance with the present invention is depicted, e.g., row $R_1$ of the embodiment of FIG. 1. A number of antenna elements $202_1$-$202_n$ are arranged in row 200. Whispering gallery mode resonators $204_1$-$204_n$ (as indicated by dashed lines) are coupled to the antenna elements $202_1$-$202_n$ and to an optical waveguide 206. Further shape characteristics of such whispering gallery mode resonators are shown and described for FIGS. 3A3B.

Figure 3A:
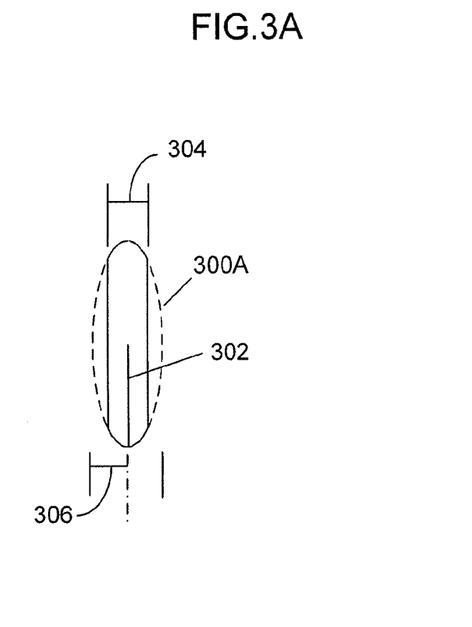

FIG. 3A depicts a side view of an embodiment of a whispering gallery mode resonator 300A according to the present disclosure, similar to those shown in FIG. 2. As shown, whispering gallery mode resonator 300A can have a shape of a spheroid (shown by dashed lines) or a portion of such a spheroid (as shown by solid outline) or be shaped as a disk. Other suitable WGM configuration or shape may be used. Resonator 300A can have a large semi-axis 302, thickness 304, and small semi-axis 306 (equal to have of the small axis length) as desired. In exemplary configurations, the small semi-axis 306 can be equal (or substantially equal) to the square root of the product of twice the large semi-axis 302 times the thickness 304, as is shown in FIG. 3A. In exemplary embodiments, for greatest sensitivity and so electrical amplification can be avoided, the Q of the resonator should be very high, e.g., $10^7$ to $10^8$ in lithium niobate, or even higher based on the electro-optic material used (this may lead to a tradeoff between bandwidth and sensitivity).

Figure 3B:
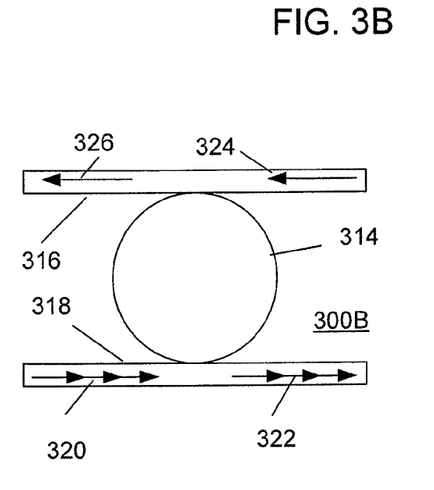
FIG. 3B depicts a side view of an optical fiber/waveguide coupling for a micro-resonator in accordance with a further embodiment of the present invention.

FIG. 3B depicts a side view of an embodiment of optical fiber/waveguide coupling configuration 300B for a whispering gallery mode resonator, in accordance with the present invention. Whispering gallery mode resonator 314 is configured and arranged between optical waveguides (e.g., fibers) 316 and 318. The configuration of FIG. 3B can be useful for switching and filtering applications, e.g., as an add-drop optical filter or a modulator, e.g., when the second waveguide is removed, e.g., as described in U.S. Pat. No. 7,092,591 and U.S. Pat. No. 7,043,117, the entire contents of both or which are incorporated herein by reference.

Waveguides 316 and 318 can be arranged such that evanescent-wave coupling can occur between fields in the waveguides 316, 318 and whispering gallery mode resonator 314. As a result of such a configuration, signals can be added and/or dropped from input 320 as desired for output 322. Resonator 314 can be spherical for certain applications.

Figures 4, 5:
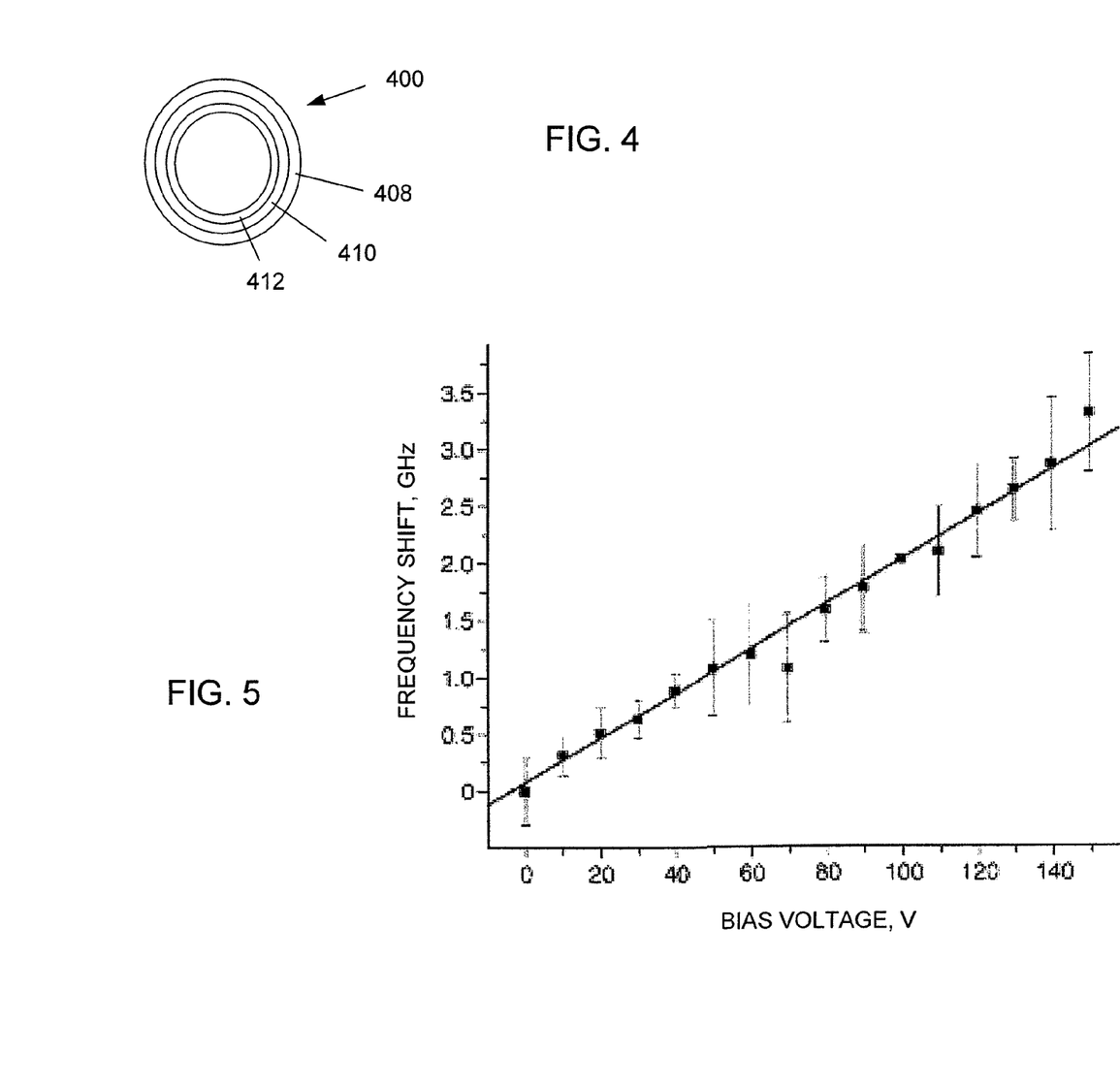
FIG. 4 depicts a side cross section view of a tunable whispering gallery mode resonator according to an exemplary embodiment of the present invention.
FIG. 5 depicts a graph indicating published results showing tuning characteristics of one configuration of a tunable whispering gallery micro-resonator having periodically-poled lithium niobate structure.

Exemplary embodiments of the present invention can make use of electrically tunable whispering gallery mode resonators. FIG. 4 depicts a side cross section view of such a tunable whispering gallery mode resonator 400 according to an exemplary embodiment of the present invention. Crystalline resonator 400 includes a special domain structure (e.g., periodically-poled) of alternating ferromagnetic regions, shown by rings 408, 410, 412. By designing the domain structure with period poling as shown, an inhomogeneous electro-optic effect can be designed in the resonator 400 in such a way that radical mode families experience frequency shifts with opposite senses to other mode families.

The domain structure of resonator 400 can allow a controllable shift of the center frequency of a single resonator mode or a group of modes with respect to the other modes as a DC bias voltage is applied across the resonator 400. This can allow tuning of one resonance of the optical cavity while keeping the rest of the spectra stationary. The filter 400 can thus be characterized along the same lines as a Fabry-Perot filter with a tunable free spectral range (FSR).

Resonator 400 (which can function as a filter) can be fabricated from a suitable crystalline electro-optic material or materials, e.g., from a commercially available lithium niobate ($LiNO_3$) wafer, and can be designed and fabricated with arbitrary passband spectrum.

FIG. 5 is a diagram 500 depicting the relative frequency shift between modes of a whispering gallery mode resonator against applied bias voltage, as reported in M. Mohageg, et al, Electron. Lett., IEE, vol. 41, no. 6 (2005).

The filter corresponding to FIG. 5 was configured similar to the embodiment shown in FIG. 4 and was designed to operate at 1.55 μm wavelength. The reproducible value of the finesse of the filter (F) exceeded F=300. A 2.6 mm diameter disc-shaped resonators of $LiNbO_3$ was fabricated, with 120 μm thickness. The rims of the cylindrical disc were polished to resemble the surface of a sphere. A ferroelectric domain structure similar to a set of rings concentric with the axis of the disc resonator was fabricated. This was done by dragging a 1 μm diameter electrode across the surface of the crystal while applying a 2.5 kV bias between the electrode and the bottom of the crystal, causing a permanent change in the structure of the material polarization. The poling process took place at room temperature and was visualized in situ by reflecting light from the bottom surface of the crystal. See U.S. Pat. No. 7,043,117 and U.S. Pat. No. 7,024,069, the entire contents of both of which are incorporated herein by reference. See also M. Mohageg, et al, Electon. Lett., IEE, vol. 41, no. 6 (2005), the entire contents of which are incorporated herein by reference.

For embodiments of tunable whispering gallery mode resonators, maximum frequency shift of the TE and TM modes, respectively may be found from the following equations:

$$\Delta v_{TE} = v_0 \frac{n_e^2}{2} \frac{\left(\int_V r_{33}(\vec{R})|\vec{E}_{TE}(\vec{R})|^2 E_Z d\vec{R}\right)}{\left(\int_V |\vec{E}_{TE}(\vec{R})|^2 d\vec{R}\right)} ; \text{ and} \quad (EQ.\ 1)$$

$$\Delta v_{TM} = v_0 \frac{n_o^2}{2} \frac{\left(\int_V r_{13}(\vec{R})|\vec{E}_{TM}(\vec{R})|^2 E_Z d\vec{R}\right)}{\left(\int_V |\vec{E}_{TM}(\vec{R})|^2 d\vec{R}\right)} ; \quad (EQ.\ 2)$$

In EQ. 1 and EQ. 2, $v_0$ is the carrier frequency of the laser or optical source, $r_{33}(\vec{R})$ and $r_{13}(\vec{R})$ are the electro-optic coefficients, the sign of which is determined by the direction of the domain of the crystal in point R, which could be either $+\vec{z}$ or $-\vec{z}$, with respect to the homogeneous DC bias electric field $E_Z$; $n_O$ and $n_e$ are the refractive indices (ordinary and extraordinary) of the whispering gallery mode resonator material; and $\vec{E}_{TE}$ and $\vec{E}_{TM}$ are the amplitudes of the electric fields of the modes; with the integration being taken over the resonator volume V. For the resonator related to FIG. 5, the values for EQ. 1 and EQ. 2 were reported as $v_0=2\times10^{14}$ Hz (the carrier frequency of the laser), $r_{33}(\vec{R})=\pm31$ pm/V and $r_{13}(\vec{R})=\pm10$ pm/V (the electro-optic coefficients), and $n_O=2.28$ and $n_e=2.2$ for $LiNbO_3$. See M. Mohageg, et al, Electon. Lett., IEE, vol. 41, no. 6 (2005).

Figure 6A:
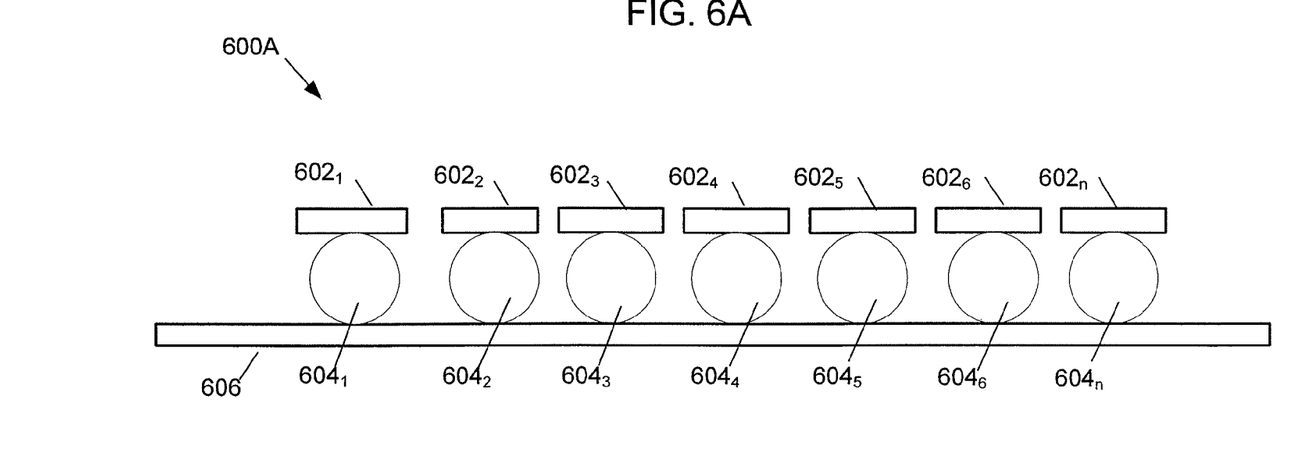
FIGS. 6A and 6B depict side views of further embodiments of the present invention, and in particular alternate coupling schemes and architectures between antenna elements and corresponding micro-resonators.

FIG. 6A depicts a side view of a system 600A according to an embodiment of the present invention. System (or row architecture) 600A, as shown, is similar to system 200 of FIG. 2, with a number of antenna elements $602_1$-$602_n$ being arranged in row 600. Whispering gallery mode resonators $604_1$-$604_n$ are coupled to the antenna elements and to optical waveguide 606.

Embodiments similar to system 600 of FIG. 6A can be made by use of a so-called "pick and place" machine. Such machines can be used to physically place and bond antenna elements $602_1$-$602_n$ to whispering gallery mode resonators $604_1$-$604_n$ and/or resonators $604_1$-$604_n$ to waveguide 606. Such processes can be repeated for an entire stacked array of antenna elements (e.g., of a FPA) and micro-resonators. Such pick and place machines as now commercially available can provide micron or sub-micron accuracy for fabrication of arrays, e.g., arrays 12 and 14 of FIG. 1.

Figure 6B:
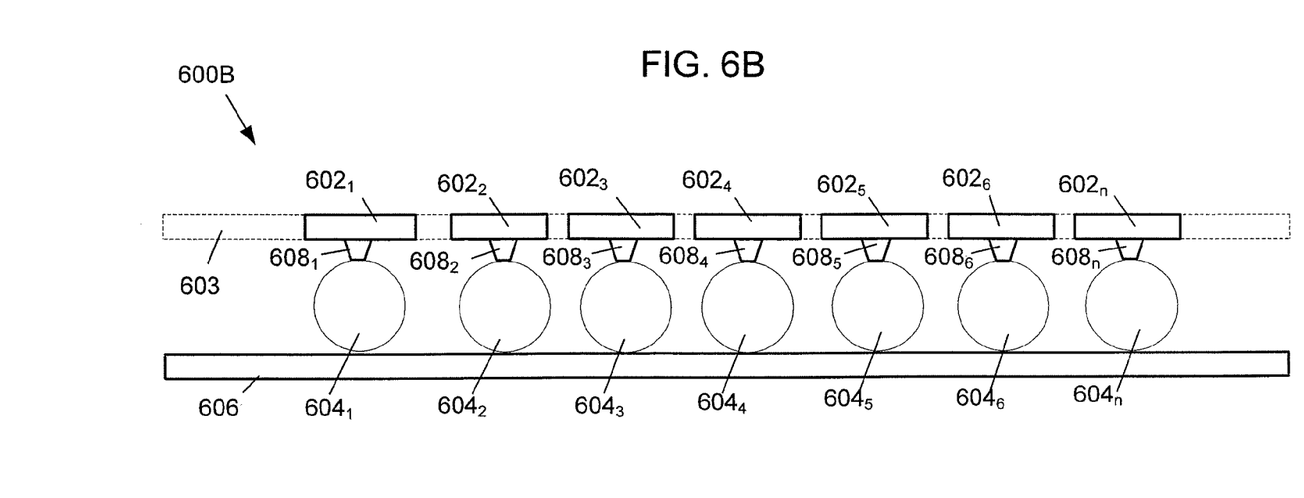

FIG. 6B depicts an alternate embodiment of coupling between image sensor elements. System 600B, as shown, is similar to system 200 of FIG. 1, with a number of antenna elements $602_1$-$602_n$ being arranged in row 600. A difference between the embodiments of FIG. 6A and that shown for FIG. 6B is that whispering gallery mode resonators $604_1$-$604_n$ are coupled to the antenna elements $602_1$-$602_n$ by way of structures $608_1$-$608_n$, e.g., indium bumps. Resonators $604_1$-$604_n$ are coupled to an optical waveguide 606, similar to the embodiment of FIG. 6A.

Embodiments similar to system 600B of FIG. 6B can be made by use of so-called "bump bonding," e.g., as utilizing indium bumps. Suitable bump bonding techniques include, but are not limited to, those that are described in U.S. Pat. No. 6,790,691 and U.S. Pat. No. 6,956,244, the entire contents of both of which patents are incorporated herein by reference.

Figure 7:
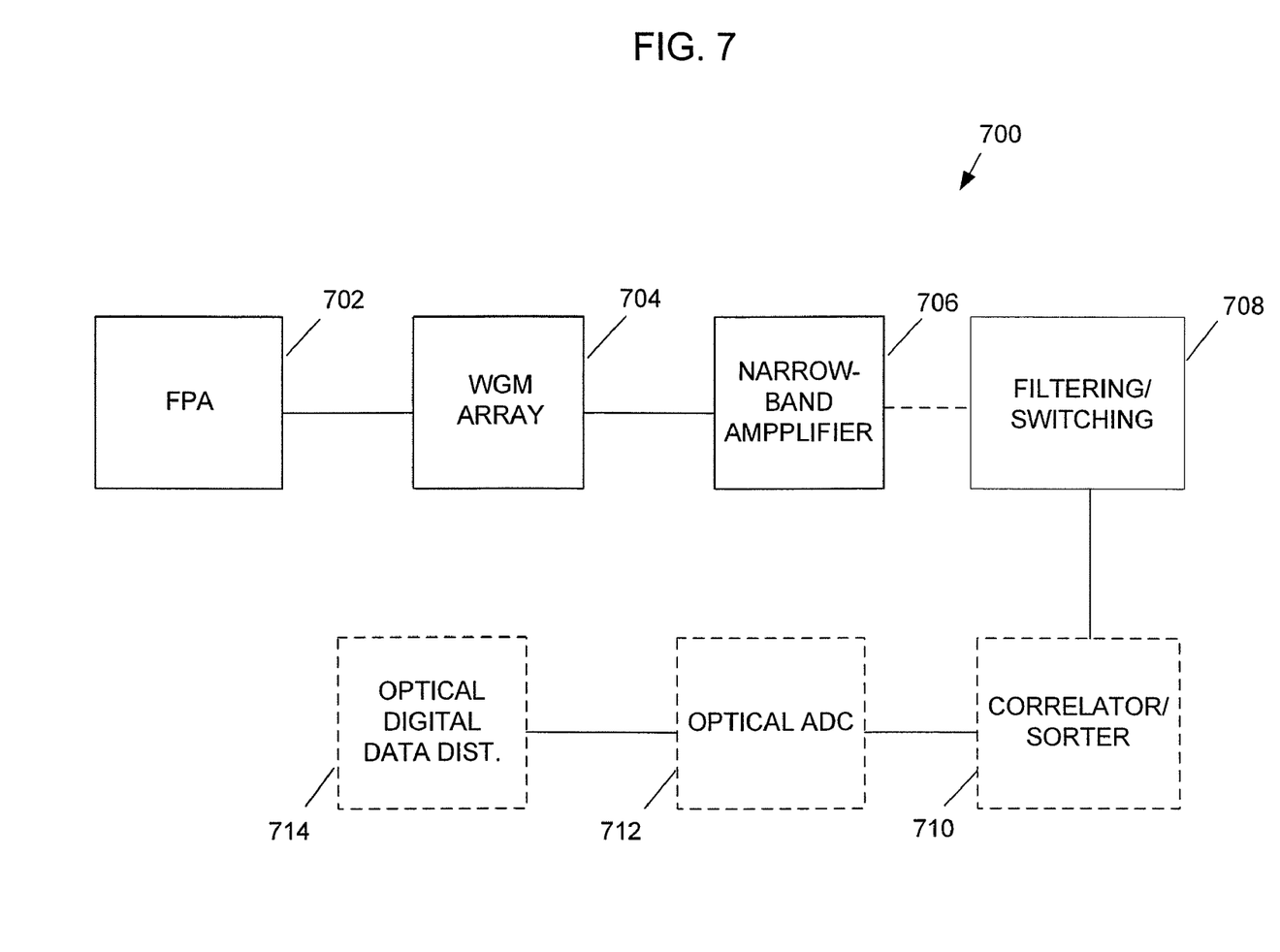
FIG. 7 depicts an imaging sensor photonic system in accordance with a further embodiment of the present disclosure.

Referring now to FIG. 7, an imaging sensor photonic architecture or system 700 is depicted in accordance with a further embodiment of the present invention. System 700 can include a focal plane array (FPA) 702 coupled to an array 704 of whispering gallery mode resonators, e.g., similar to system 10 of FIG. 1. One or more tunable optical narrow-band amplifiers 706 may be present to amplify the optical signals in optical waveguides associated with the whispering gallery mode resonators. By providing optical amplification, system 700 can function as an electro-optic modulator with amplification functionality and may be useful as part of an image processing or other optical system, e.g., a radar or ladar system.

In exemplary embodiments of system 700, optical tunable narrow-band amplifiers 706 can be suitable Brillouin amplifiers. In addition to narrow-band amplifier 706, optional filtering and switching can be performed, e.g., by one or more whispering gallery mode resonators 708 configured as shown in FIG. 3B.

As shown in FIG. 7, the imaging sensor photonic architecture 700 may be implemented with additional components of an image processor/photonic architecture. For example, the filtering/switching component 708 can be connected to a correlator/sorter 710. An analog-to-digital converter (ADC) 712 may be present, and may be used for optical digital data distribution network component(s) 714. Further techniques of modulation are described and shown for FIG. 8.

Figure 8:
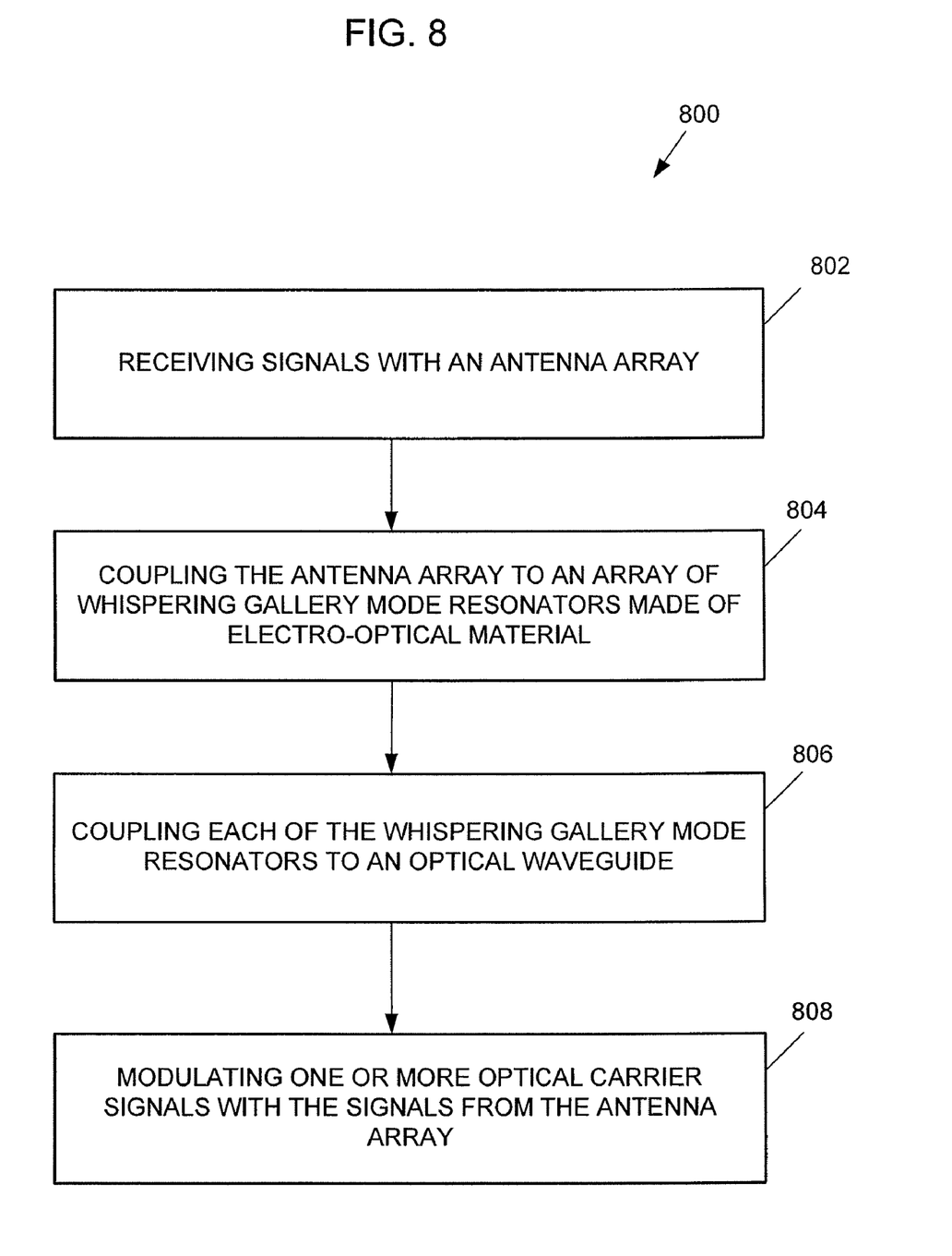
FIG. 8 depicts a method of modulating optical carrier signals based on electrical signals from an antenna array or image sensor, in accordance with a further embodiment of the present disclosure.

Referring to FIG. 8, a method 800 of modulating signals received by an antenna array or image sensor is depicted, in accordance with a further embodiment of the present invention. For method 800, signals (such as EM or light) can be received with an antenna array, as shown at 802. The antenna array can be coupled to an array of whispering gallery mode resonators made of suitable electro-optical material, as shown at 804. Suitable crystalline materials such as described previously can be used for the whispering gallery mode resonators. Each of the whispering gallery mode resonators can be coupled to an optical waveguide, as shown at 806.

Continuing with the description of method 800, one or more optical carrier signals carried in the waveguide(s) can be modulated by the whispering gallery mode resonators, as shown at 808. The optical carriers signals may be produced and modulated in accordance with the ITU Grid used for WDM applications and systems in exemplary embodiment. In exemplary embodiments, the optical carrier signals can be optically amplified, such as by Brillouin or Raman amplification.

Accordingly, embodiments of the present invention can provide relatively compact electro-optic conversion for antenna arrays, with high bandwidth, high gain, and/or low noise figures. Embodiments/aspects of the present invention can provide compact imaging focal plane arrays or antenna arrays with data bandwidths beyond hundreds of GHz—interfaced and processed with photonic elements fitting behind the focal plane arrays and using low electrical power.

Embodiments/aspects of the present invention may have relatively low electrical power requirements as the only electrical power required is the few milliwatts required for the optical sources, e.g., vertical cavity surface-emitting lasers ("VCSELs") needed to produce each wavelength, with each laser driving a number of different waveguides. (Electrical power cooling for the FPA or control circuits may be desirable and are ignored here.) Simplified construction/architectures may be provided as no electrical signal amplification is required prior to the optical modulation provided by the whispering gallery mode resonators. Moreover, arrays of micro-resonators provided by embodiments of the present invention can be of dimensions comparable to those of focal plane arrays, and may therefore be mechanically integrated with such focal plane arrays in exemplary embodiments. Rapid tuning of the micro-resonators can also be provided by embodiments of the present invention so as to allow agility to a readout process and thereby assist the processing function. Subsequent narrowband optical amplification can be used to compensate for weak signal strength, eliminating the need for an electrical low-noise amplifier ("LNA") between the pixel and the micro-resonator. Moreover, the speed of the associated electro-optic modulation can be utilized for sub-microsecond spectral scanning and/or sorting. Additionally, embodiments of electro-optics systems, methods, and architectures according to the present invention can provide improvements in size weight and power ("SWAP") characteristics relative to prior art designs.

The description of the invention is provided to enable any person skilled in the art to practice the various embodiments described herein. While the present invention has been particularly described with reference to the various figures and embodiments, it should be understood that these are for illustration purposes only and should not be taken as limiting the scope of the invention. For instance, various numerical ranges such as the ranges for the far field, near region and operating frequencies are provided by way of example and not by way of limitation.

There may be many other ways to implement the invention. Various functions and elements described herein may be partitioned differently from those shown without departing from the spirit and scope of the invention. Various modifications to these embodiments will be readily apparent to those skilled in the art, and generic principles defined herein may be applied to other embodiments. Thus, many changes and modifications may be made to the invention, by one having ordinary skill in the art, without departing from the spirit and scope of the invention.

All structural and functional equivalents to the elements of the various embodiments described throughout this disclosure that are known or later come to be known to those of ordinary skill in the art are expressly incorporated herein by reference and intended to be encompassed by the invention. Moreover, nothing disclosed herein is intended to be dedicated to the public regardless of whether such disclosure is explicitly recited in the above description While certain embodiments have been described herein, it will be understood by one skilled in the art that the methods, systems, and apparatus of the present disclosure may be embodied in other specific forms without departing from the spirit thereof.

Accordingly, the embodiments described herein, and as claimed in the attached claims, are to be considered in all respects as illustrative of the present disclosure and not restrictive.

What is claimed is:

1. An electro-optic modulation system comprising:
    an antenna array of antenna elements that are each configured and arranged to produce an output signal based on a received signal;
    a whispering gallery mode resonator array of whispering gallery mode resonators electrically coupled to the antenna array, wherein each whispering gallery mode resonator is made of an electro-optic crystalline material with electrodes on its surface, and wherein a whispering gallery mode resonator is coupled to each antenna element of the antenna array and configured and arranged to receive the output electrical signal of the antenna element; and
    a plurality of optical waveguides coupled to the whispering gallery mode array, each optical waveguide configured and arranged to carry a plurality of optical carrier signals.

2. The system of claim 1, wherein the antenna array comprises a charge-coupled device (CCD) photodiode array.

3. The system of claim 1, wherein the antenna array comprises an array of microwave antennas.

4. The system of claim 1, further comprising a plurality of optical sources coupled to each optical wave guide.

5. The system of claim 4, wherein the optical sources comprise laser diodes.

6. The system of claim 1, wherein the antenna array and whispering gallery mode resonator array have m rows and n columns forming m×n arrays.

7. The system of claim 6, wherein the plurality of optical waveguides comprises m waveguides coupled to the m rows of the whispering gallery mode resonator array.

8. The system of claim 6, wherein m equals n.

9. The system of claim 1, wherein the whispering gallery mode resonator array comprises whispering gallery mode resonators made of lithium niobate, lithium tanatalate, ammonium dihydrogen phosphate, potassium dihydrogen phosphate, or cadmium telluride.

10. The system of claim 4, wherein the plurality of optical carrier signals conform to the ITU Grid.

11. The system of claim 2, wherein the charge-coupled device (CCD) photodiode array comprises infrared photodetectors.

12. A method of amplitude modulating optical signals with signals detected from an antenna array, the method comprising:
    receiving signals with an antenna array;
    coupling the antenna array to a whispering gallery mode resonator array of whispering gallery mode resonators made of electro-optical crystalline material;
    coupling each of the whispering gallery mode resonators to an optical waveguide; and
    modulating one or more optical carrier signals in the optical waveguides with the signals from the antenna array and producing modulated optical signals.

13. The method of claim 12, wherein coupling the antenna array to a whispering gallery resonator array comprises bump bonding the antenna array to the whispering gallery mode resonator array.

14. The method of claim 12, wherein coupling the antenna array to a whispering gallery mode resonator array comprises coupling m×n resonators to m×n antenna elements.

15. The method of claim 14, wherein coupling each of the whispering gallery mode resonators to an optical waveguide comprises coupling n resonators to each of m waveguides.

16. The method of claim 15, wherein coupling each of the whispering gallery mode resonators to an optical waveguide comprises coupling the resonators to one or more optical fibers.

17. The method of claim 13, wherein modulating one or more optical carrier signals in the optical waveguides with the signals from the antenna array comprises modulating a plurality of carrier signals conforming to the ITU Grid.

18. The method of claim 13, wherein receiving signals with an antenna array comprises receiving signals with a charge-coupled device (CCD) photodiode array.

19. The method of claim 13, wherein receiving signals with an antenna array comprises receiving signals with an array of microwave antennas.

20. The method of claim 13, further comprising optically amplifying the modulated optical signals.

21. The method of claim 20, wherein amplifying the modulated optical signals comprises Brillouin amplification.

22. A photonic imaging sensor system comprising:
a focal plane array including m rows and n columns of array elements;
a whispering gallery mode resonator array including m rows and n columns of whispering gallery mode resonators coupled to the focal plane array, wherein each whispering gallery mode resonator is coupled to a respective array element and configured to receive an output from the array element and based on the output modulate an optical carrier signal;
a wavelength division multiplexing system including a plurality of optical sources and a plurality of optical waveguides configured to carry optical carrier signals produced by the plurality of optical sources; and
one or more narrow-band optical amplifiers configured and arranged to amplify modulated optical carrier signals in the plurality of optical waveguides.

23. The system of claim 22, wherein the one or more optical narrow-band amplifiers comprise one or more Brillouin amplifiers.

24. The system of claim 22, farther comprising one or more optical filters.

25. The system of claim 24, wherein the one or more optical filters comprises one or more add-drop filters.

26. The system of claim 25, wherein the one or more add-drop filter comprise whispering gallery mode resonators.

27. The system of claim 22, wherein the a wavelength division multiplexing system in configured and arranged to produce optical carrier signals conforming to the ITU Grid.

* * * * *

UNITED STATES PATENT AND TRADEMARK OFFICE
CERTIFICATE OF CORRECTION

| | |
|---|---|
| PATENT NO. | : 7,657,129 B2 |
| APPLICATION NO. | : 12/203888 |
| DATED | : February 2, 2010 |
| INVENTOR(S) | : Thomas W. Karras |

It is certified that error appears in the above-identified patent and that said Letters Patent is hereby corrected as shown below:

Column 12, Line 7: Replace "farther" with --further--.

Column 12, Line 13: Remove "a".

Column 12, Line 14: Replace "in" with --is--.

Signed and Sealed this

Eighth Day of June, 2010

David J. Kappos
*Director of the United States Patent and Trademark Office*